United States Patent

Sonoda et al.

[11] Patent Number: 5,329,111
[45] Date of Patent: Jul. 12, 1994

[54] IMAGE READER WITH ADJUSTABLE CONTRAST RANGE

[75] Inventors: Shinya Sonoda, Yamashina; Atsushi Noda; Hiroki Tabata, both of Takatsuki; Masashi Sugimoto, Kawanishi; Junji Hiraishi, Yawata, all of Japan

[73] Assignee: Omron Corporation, Kyoto, Japan

[21] Appl. No.: 904,053

[22] Filed: Jun. 26, 1992

[30] Foreign Application Priority Data

Jun. 27, 1991 [JP] Japan ............................ 3-182917
Jun. 27, 1991 [JP] Japan ............................ 3-182918

[51] Int. Cl.[5] ........................ H01J 40/14; H04N 3/14
[52] U.S. Cl. .............................. 250/208.1; 250/214 R; 348/243
[58] Field of Search ............... 250/208.1, 226, 214 C, 250/214 R, 238; 358/213.16, 213.15, 213.31

[56] References Cited

U.S. PATENT DOCUMENTS

| | | | |
|---|---|---|---|
| 4,723,170 | 2/1988 | Jaspers | 358/213.16 |
| 4,786,969 | 11/1988 | Shouji et al. | 358/213.16 |
| 4,862,286 | 8/1989 | Suda et al. | 358/213.16 |
| 4,907,084 | 3/1990 | Nagafusa | 358/213.16 |
| 4,916,307 | 4/1990 | Nishibe et al. | 250/214 C |
| 5,027,148 | 6/1991 | Anagnostopoulos | 358/213.16 |
| 5,105,276 | 4/1992 | Schrock | 358/213.16 |

Primary Examiner—David C. Nelms
Assistant Examiner—Michael Messinger
Attorney, Agent, or Firm—Foley & Lardner

[57] ABSTRACT

An image input device photoelectrically reads a document and outputs digital data. This image reader includes a first voltage generating circuit for generating a first voltage for setting an upper limit of contrast, a second voltage generating circuit for generating a second voltage for setting a lower limit of contrast, and an A/D converter for converting an input analog signal to a digital signal in accordance with the first and second voltages. At least one of the voltages generated by the first voltage generating circuit and second voltage generating circuit is variable. Also disclosed is an image reader including a dark voltage memory circuit, storing dark voltages corresponding to color signals R, G and B, a first switching circuit sequentially switching the output of the dark voltage memory circuit and outputting a selected dark voltage, a second switching circuit adapted to synchronously output a selected color signal corresponding to the selected dark voltage, and a differential amplifier subtracting the selected dark voltage from said selected color signal.

8 Claims, 9 Drawing Sheets

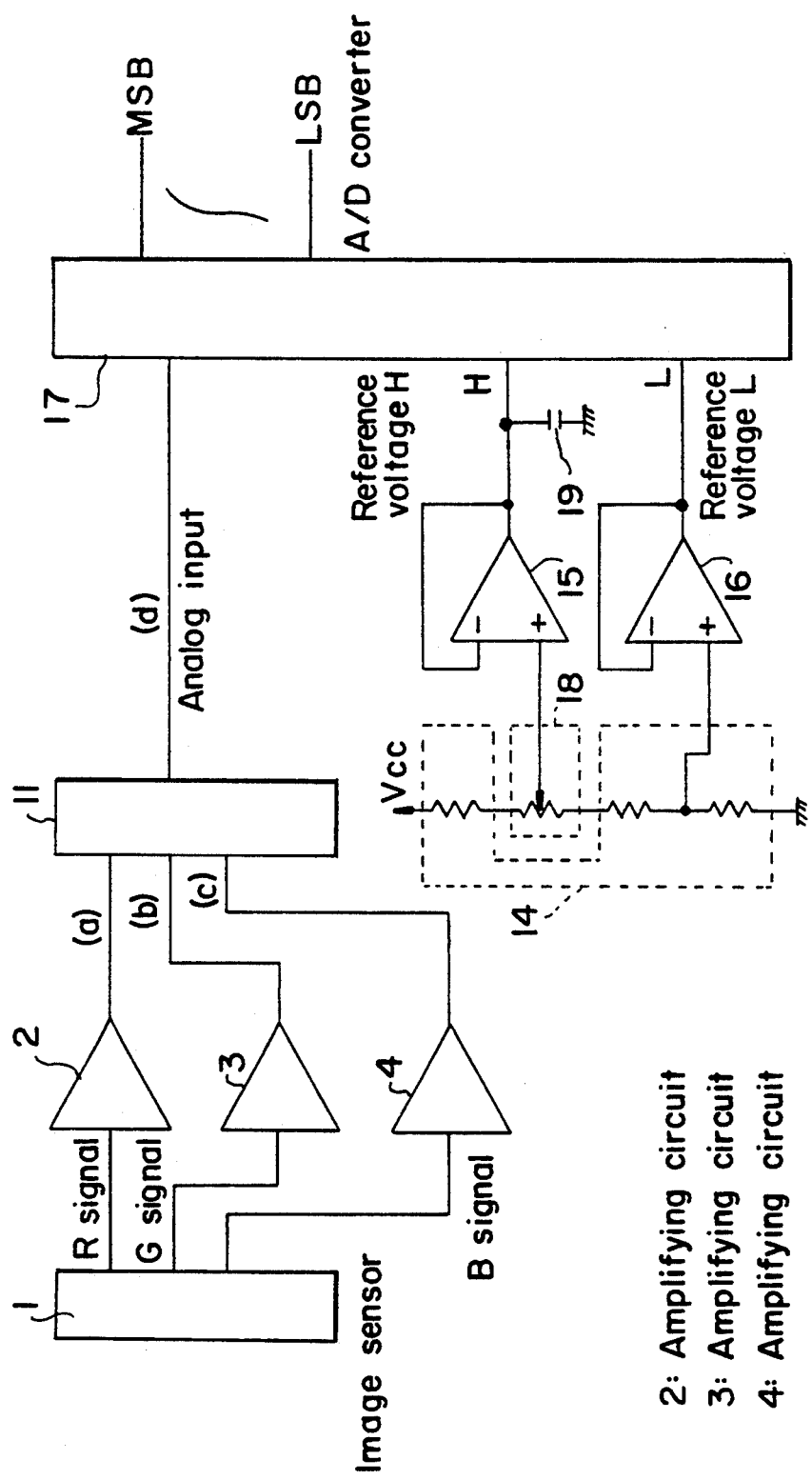

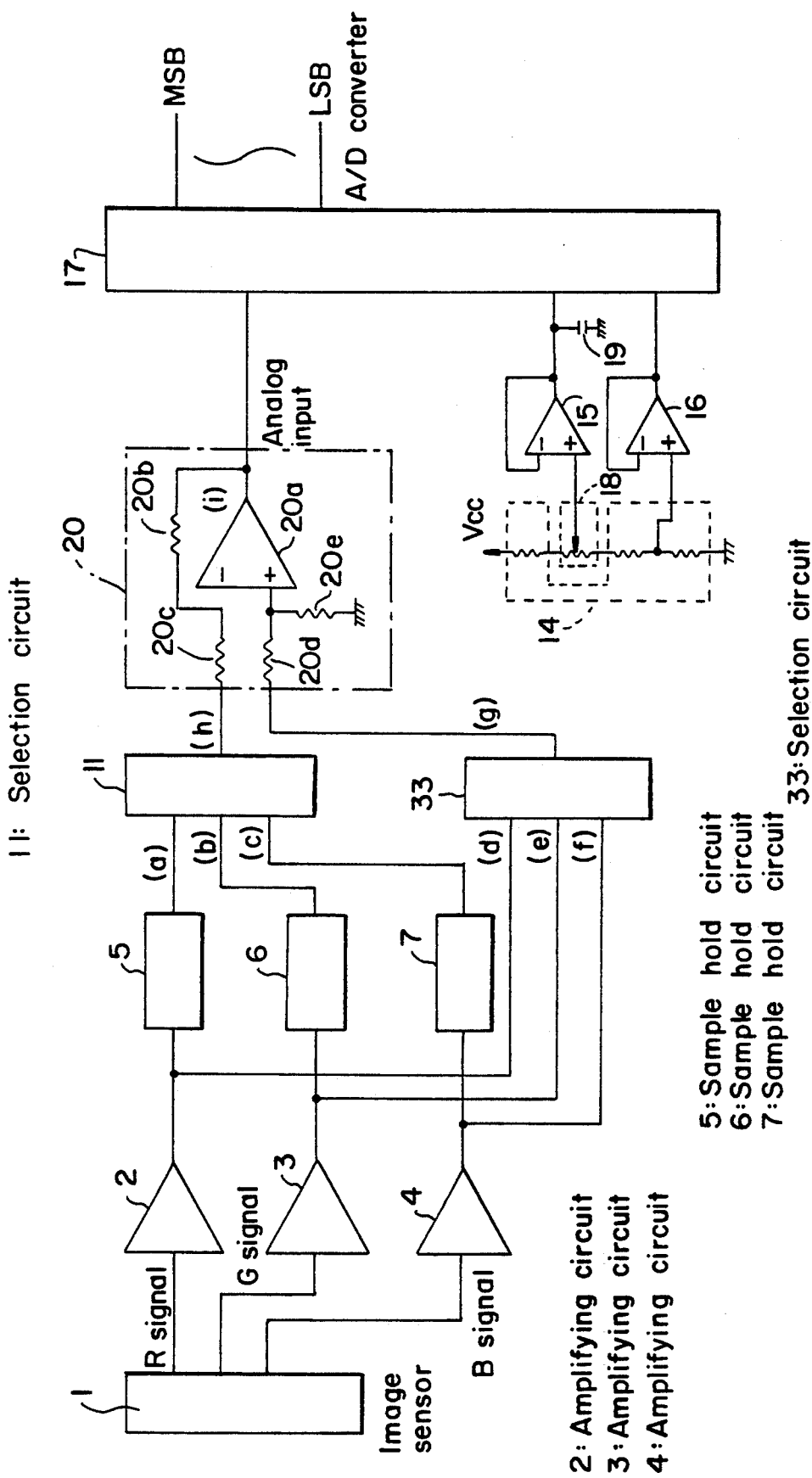

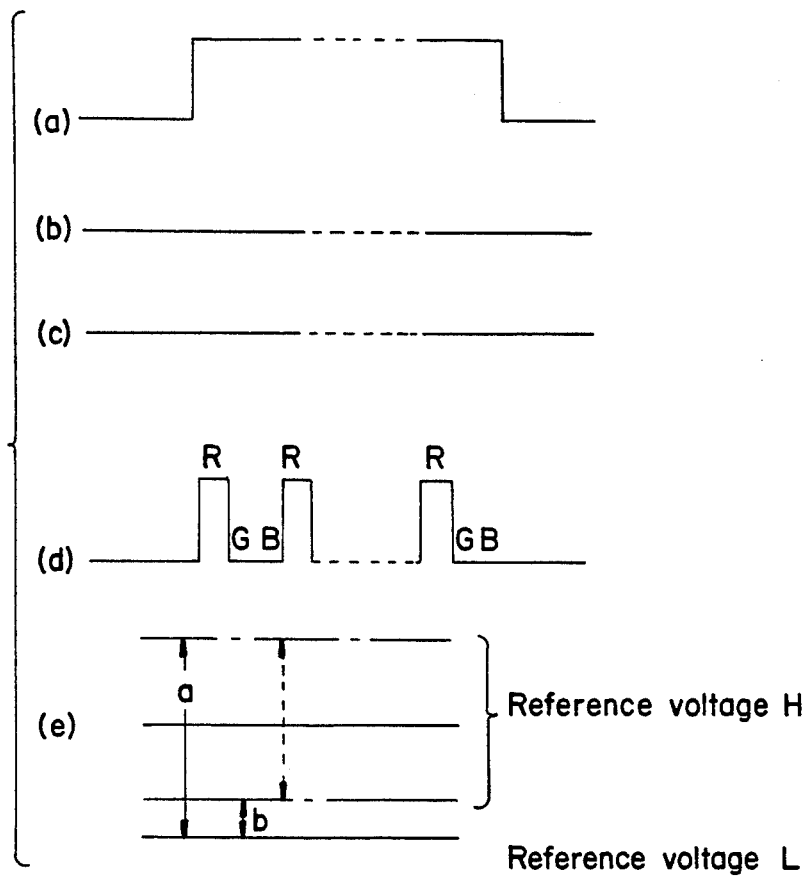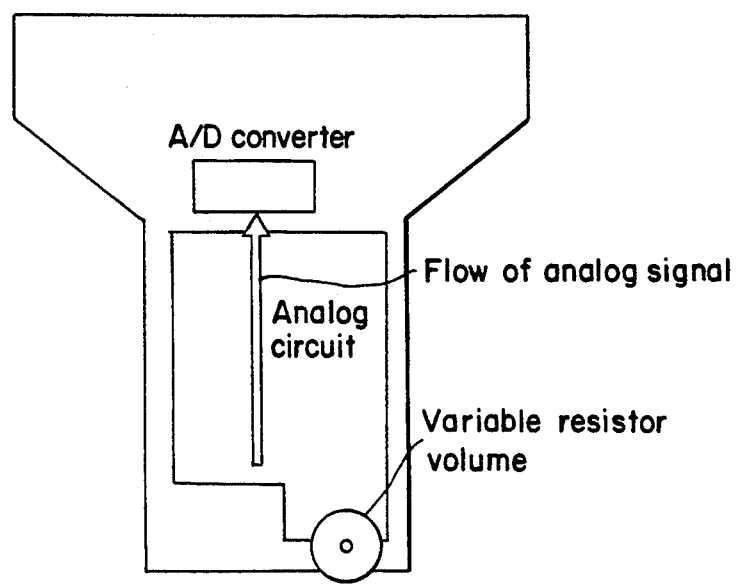

IMAGE READER WITH ADJUSTABLE CONTRAST RANGE

This invention relates to an image input device that photoelectrically reads a document and inputs the data into a computer, a word processor or the like.

BACKGROUND OF THE INVENTION

An image reader which reads a printed image and converts it to an electric signal is known. Such a device is provided with a contrast adjusting function with which the user may freely control contrast to obtain the optimum picture according to the original. Thus, as illustrated in FIG. 6, color signals R, G and B from an image sensor 1 are amplified by amplifying circuits 2, 3 and 4 and sequentially switched by a selection circuit 11 which is supplied with a switching signal from a device not shown.

Referring to FIG. 7, which is a specific embodiment of FIG. 6, the image sensor 1 outputs color signals R, G and B which are then independently amplified by amplifiers 2 to 4.

Taking the R signal as an example, FIG. 10(a) shows the waveform of the output signal from the amplifier 2 which is obtained when the picture elements of the image sensor 1 are sequentially scanned. In the image sensor 1, the plural picture elements in the first scanning area and those in the last scanning area constitute unused areas which are not used in the reading of a document. Thus, the areas T1 and T3 in FIG. 10(a) represent unused picture elements and the area T2, exclusive of these areas, represents effective picture elements exposed to light. As seen from FIG. 10(a), the output voltage of the area not exposed to light is a dark voltage, which is lower than the output voltage of the effective picture elements. Representative of this dark voltage, a predetermined value, for example a value found by averaging, is memorized by a sample hold circuit 5 in response to a timing signal from a circuit not shown, and the signal shown in FIG. 10(b) is output. The output signal of the sample hold circuit 5 and the output signal of the amplifier 2 are differentially amplified in a different amplification circuit 8. As a result, a signal available on subtraction of the dark voltage from the R signal is finally output as shown in FIG. 10(c).

The same applies to G and B signals, as shown in FIG. 7. Thus, the dark voltages of the respective color signals are memorized in sample hold circuits 6, 7, respectively, and subtracted from the color signals in differential amplification circuits 9, 10. The differential amplification circuit 8 comprises a differential amplifier 8a and resistors 8b through 8e, differential amplification circuit 9 comprises a differential amplifier 9a and resistors 9b through 9e, and differential amplification circuits 10 comprises a differential amplifier 10a and resistors 10b through 10e.

The output signals from the differential amplification circuits 8 through 10 are fed to a selection circuit 11, from which they are output in synchronism with selection signals supplied from a circuit not shown and converted to digital signals by and A/D converter 17.

The analog signal output of the selection circuit 11 is amplified by an amplifying circuit 12 with a gain predetermined according to a variable resistor 13 and converted to a digital signal in bits from a most significant bit (MSB) to a least significant bit (LSB) by the A/D converter 17. This digital signal corresponds to the levels of reference voltages H and L from a reference voltage generator 14 and amplifiers 15 and 16.

The contrast of the digital signal is determined by the variable resistor 13 and is increased as the gain of the amplifier 12 is increased. FIG. 8 shows the waveforms at respective stages in the circuit illustrated in FIG. 6. The illustrated example represents the case in which a red document is read. Here, only the R signal component of FIG. 8(a) is generated, with the G signal component of FIG. 8(b) and B signal component of FIG. 8(c) being absent. FIG. 8(d) shows the output signals of the selection circuit 11, indicating the sequential selection of the R, G and B signals, but only the R signal is output. FIGS. 8(e) and (f) show signals after gain adjustment. FIG. 8(e) represents the waveform pattern with contrast reduced by decreasing the amplification factor and FIG. 8(f) represents the pattern with contrast enhanced by increasing the amplification factor.

The above conventional image reader, in which the amplifier 12 deals with picture signals of large amplitude, is disadvantageous in that it requires a large throughput rate and is, therefore, expensive, and unless this requirement of large throughput rate is satisfied, the waveform is blunted as shown in FIG. 8(f), with the result that high fidelity color reproduction cannot be accomplished. Moreover, a variable resistor for contrast adjustment must be disposed at the periphery of a casing as shown in FIG. 9 so that the user may easily have access to it. This entails an undue routing of the signal as indicated by the bold line and, hence, degradation of picture quality. Conversely if priority is given to picture quality, the variable resistor will be limited in accessibility and exterior design.

SUMMARY OF THE INVENTION

An object of this invention is to provide an image reader which is highly amenable to contrast adjustment and immune to degradation of image quality.

The above object is accomplished by the image reader of the invention which reads a picture signal in the analog form and converts it to a digital signal. This image reader includes a first voltage generating circuit for generating a first voltage for setting an upper limit of contrast, a second voltage generating circuit for generating a second voltage for setting a lower limit of contrast, and an A/D converter for converting an input analog signal to a digital signal in accordance with the first and second voltages. At least one of the voltages generated by the first voltage generating circuit and second voltage generating circuit is variable.

Changing either one of the voltages generated by the first and second voltage generating circuits varies the breadth between the upper limit and lower limit of contrast, with the result that the contrast is changed even if the analog signal is constant in amplitude.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a circuit diagram showing an embodiment of the invention;

FIG. 2 is a detailed embodiment of FIG. 1;

FIGS. 3(a), 3(b), 3(c), 3(d) and 3(e) are waveform diagrams showing various waveforms in the circuit of FIG. 1;

FIG. 4 is a diagram showing the flow of signals in the circuit of FIG. 1;

DETAILED DESCRIPTION OF THE PREFERRED EMBODIMENTS

Figure 5:
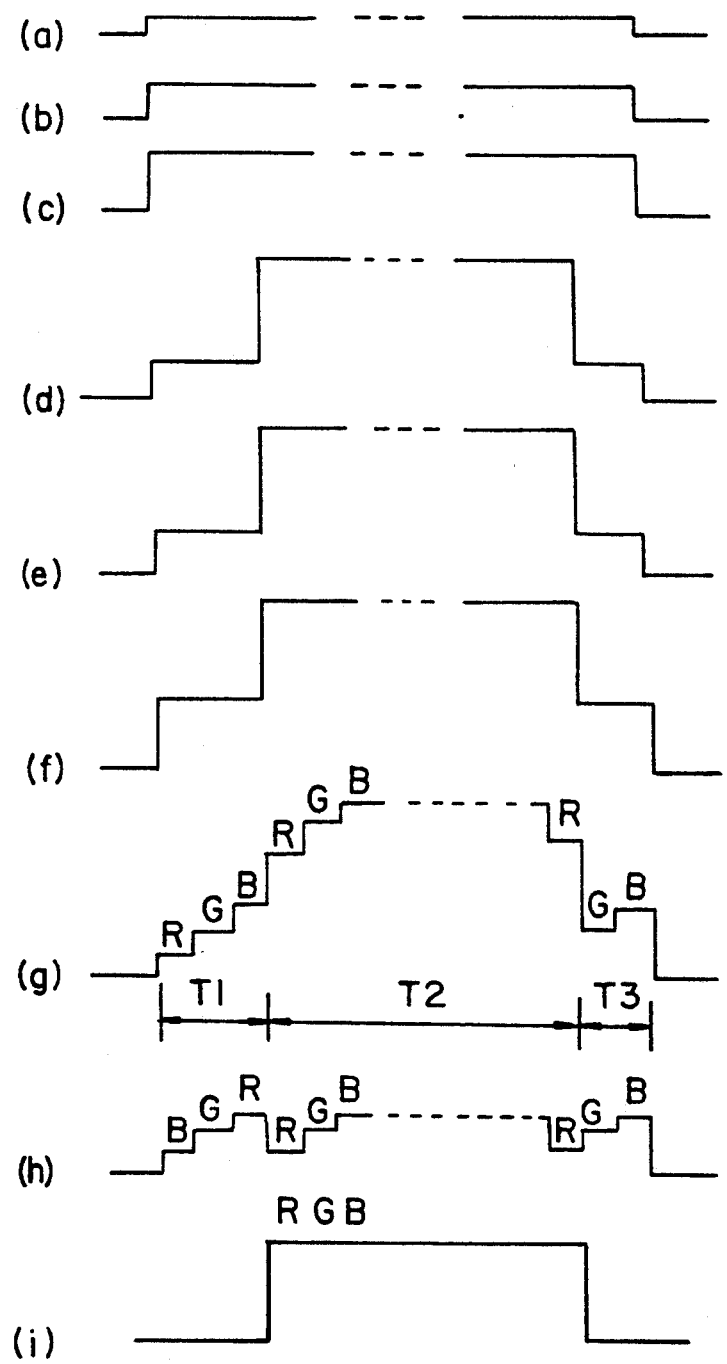
FIGS. 5(a), 5(b), 5(c), 5(d), 5(e), 5(f), 5(g), 5(h) and (5i) are waveform diagrams showing various waveforms in the circuit of FIG. 2.

FIG. 1 is a circuit diagram showing an image reader embodying the principles of the invention. In FIGS. 1 and 2, the like parts are designated by the like numerals used in FIGS. 6 and 7. The reference numeral 14 indicates a reference voltage generating circuit, in which the level of reference voltage H is altered by the variable resistor 18.

FIG. 2 is a detailed embodiment of FIG. 1. The reference numeral 33 indicates a selection circuit similar to the selection circuit 11.

Assuming that the selection signal selects the dark voltage corresponding to the R signal, the selected dark voltage from selector circuit 11 is fed to a reversing input terminal of a differential amplifier 20a through a resistor 20c. Since the selection circuit 33 synchronously selects the color signal corresponding to the dark voltage, the R signal is selected as the color signal and is fed to a non-reversing input terminal of the differential amplifier 20a through a resistance 20d. As a consequence, the dark voltage is subtracted from the R color signal and the resulting dark voltage-adjusted R signal is converted to a digital signal by an A/D converter 12 and output.

The same applies to the G and B signals. Since this system sequentially selects R, G and B color signals and the corresponding dark voltages and feeds them to one differential amplifier 20, it is not necessary to provide a plurality of differential amplifiers and related components.

Figure 6:
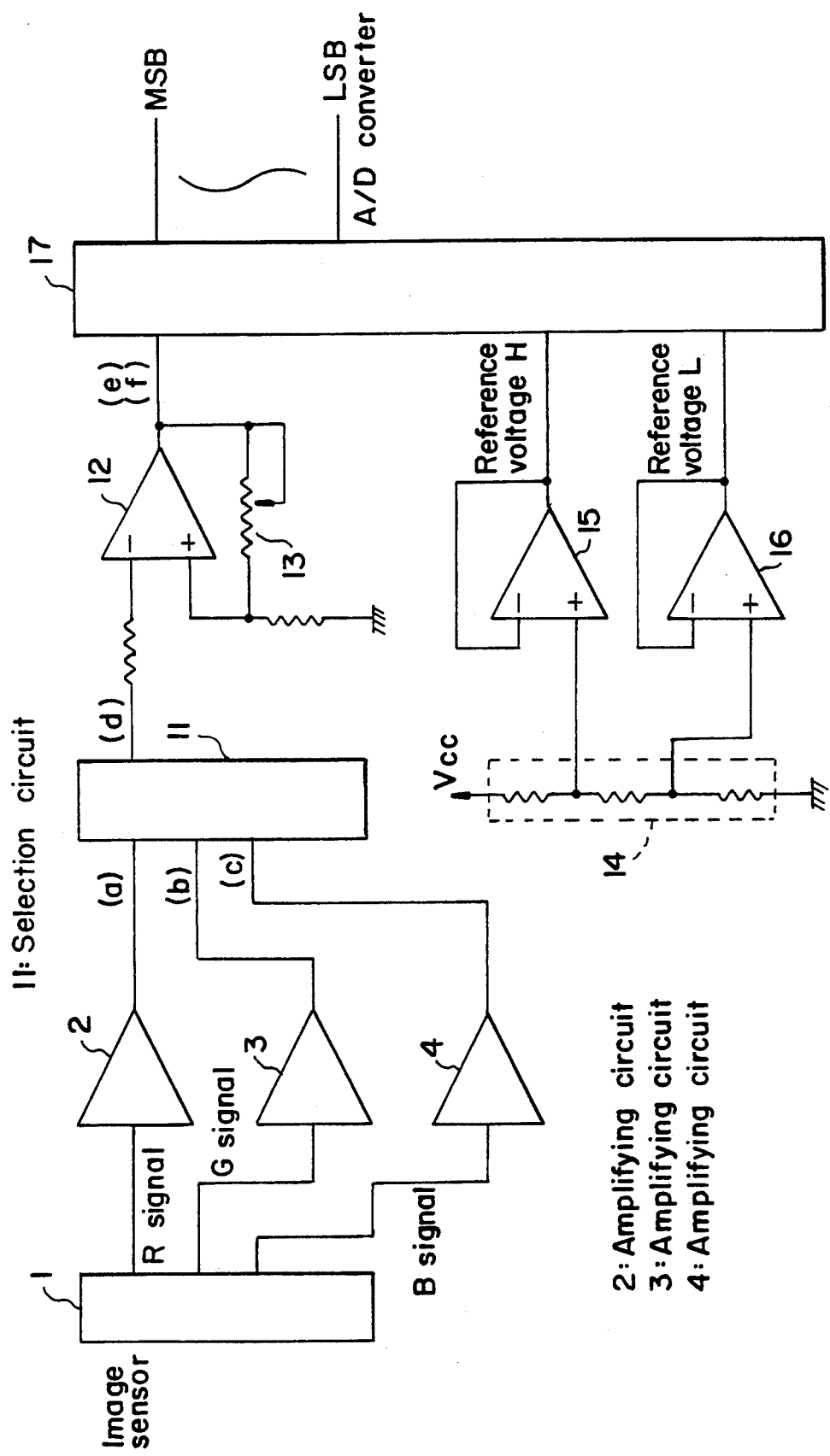
FIG. 6 is a circuit diagram showing a conventional image reader.
Figure 7:
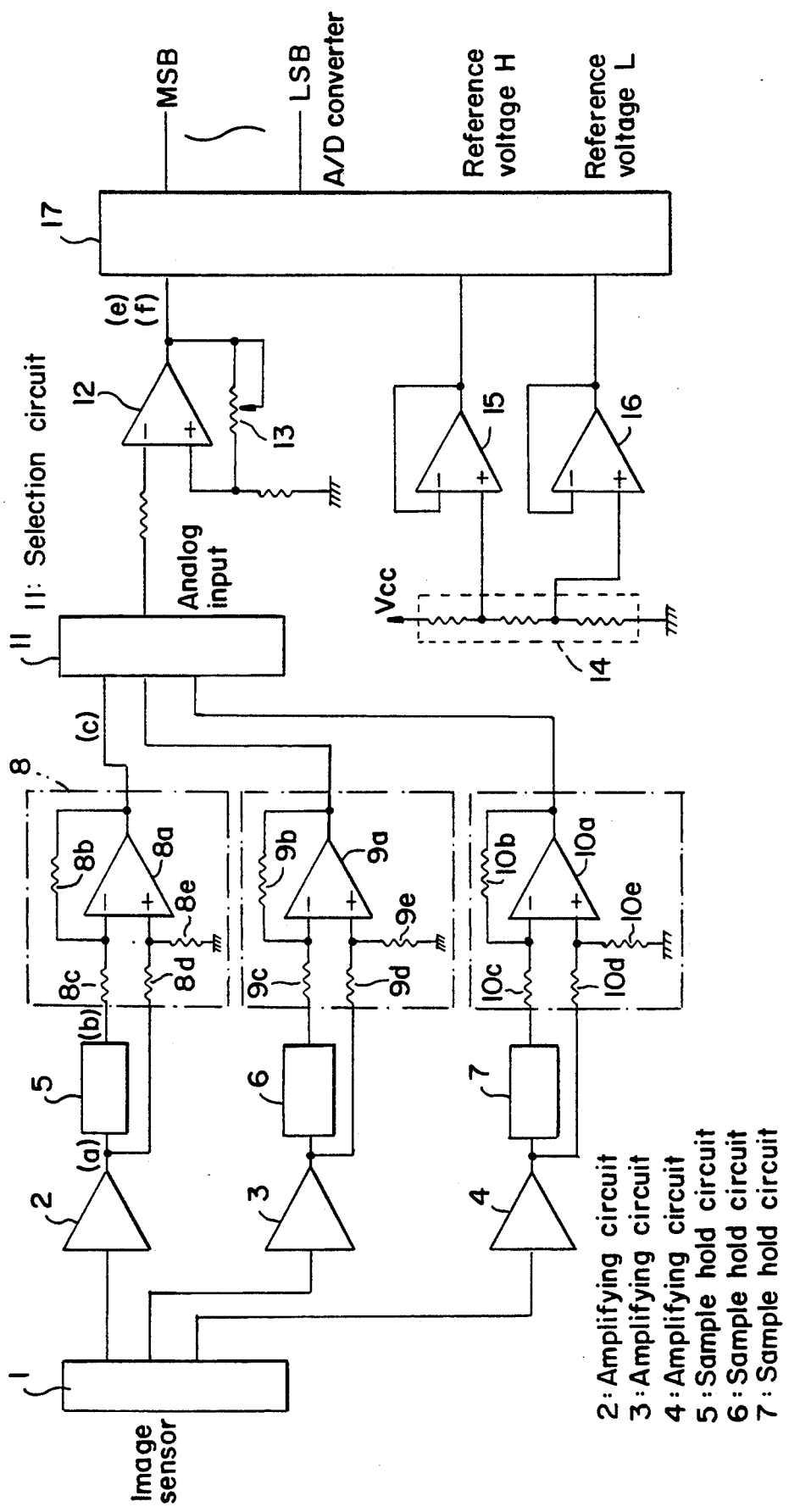
FIG. 7 is a detailed embodiment of FIG. 6.

In the above system, the action up to the stage of said selection circuit 11 is the same as that of the device shown in FIG. 6. In the selection circuit 33, the analog signals R, G and B are sequentially selected and fed to the A/D converter 17. As in the case of FIG. 6, the A/D converter 17 converts the analog signal between the reference voltages H and L to a digital signal which may have 256 gradations (when digital signals from MSB to LSB are 8-bit signals.)

Since the amplitude of the analog signal is fixed, contrast is governed by the difference between the reference voltage H and L. Therefore, in this embodiment, the H level of reference voltage is changed to vary the difference between H and L and thereby adjust the contrast of the signal.

Figure 8:
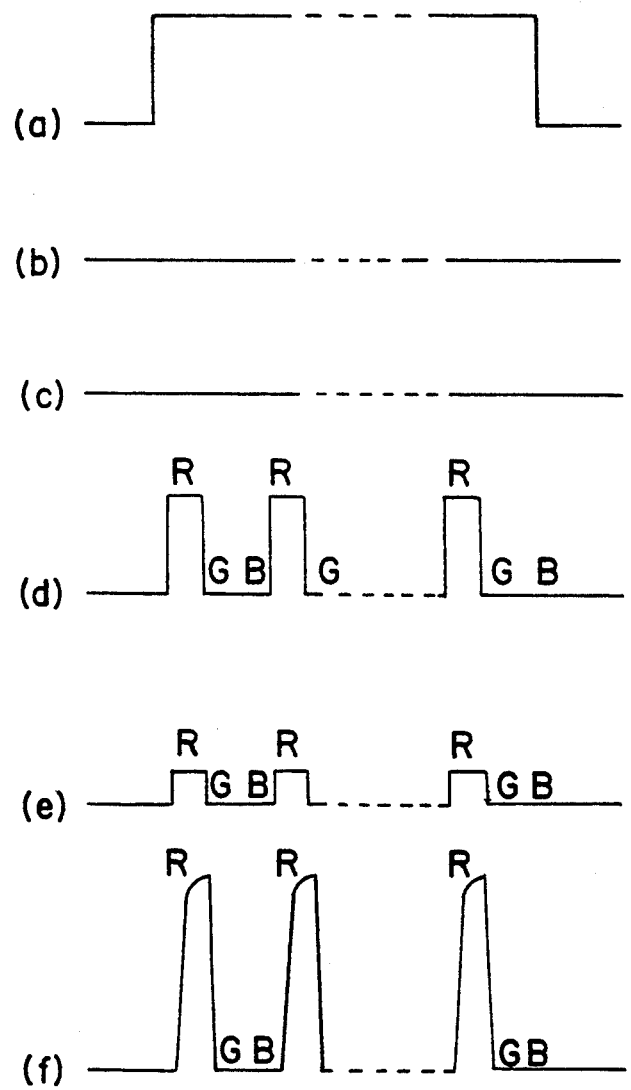
FIGS. 8(a), 8(b), 8(c), 8(d), 8(e) and 8(f) are waveform diagrams showing various waveforms in the circuit of FIG. 6.
Figure 9:
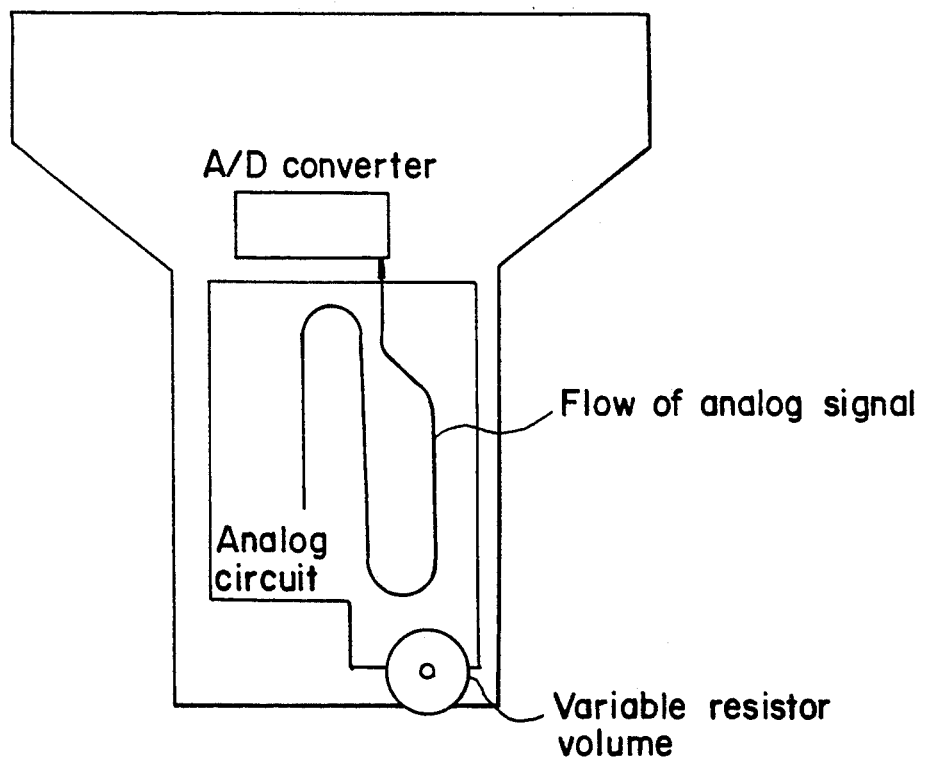
FIG. 9 is a diagram showing the flow of signals in the circuit of FIG. 6.
Figure 10:
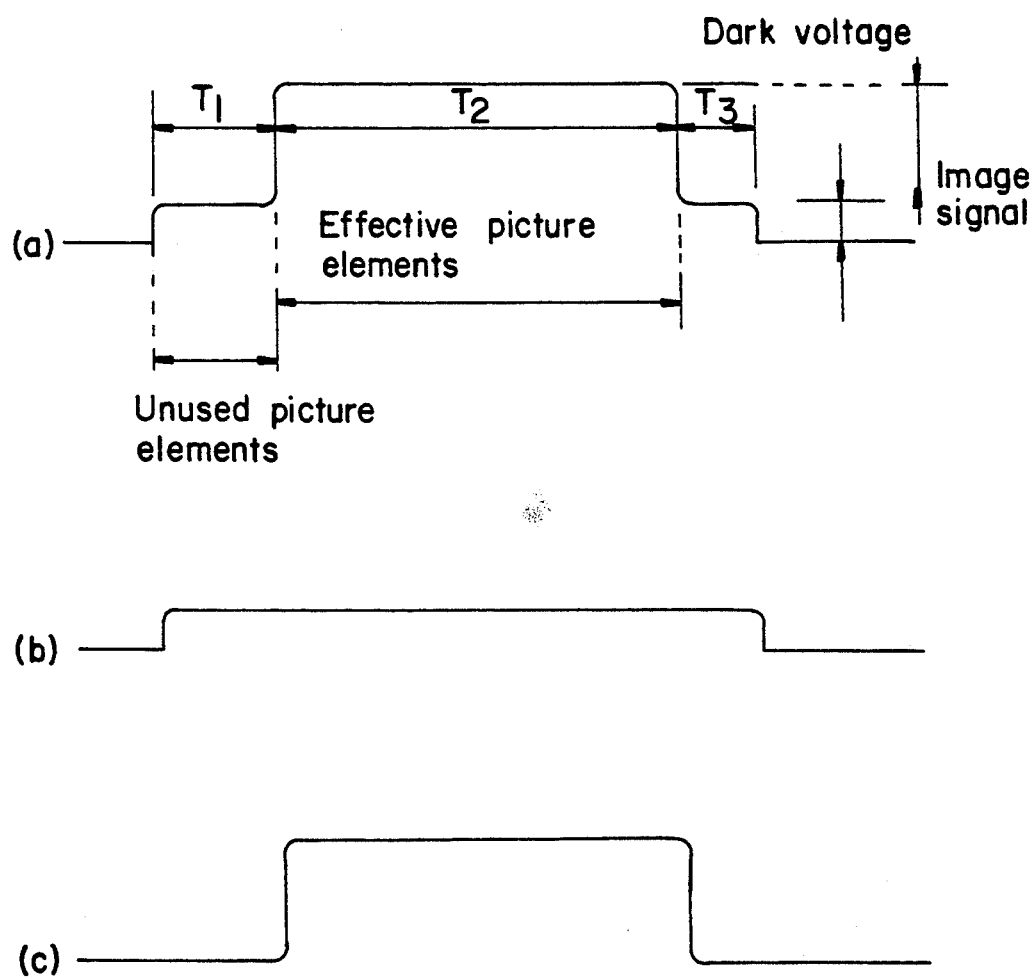
FIGS. 10(a), 10(b) and 10(c) are waveform diagrams showing various waveforms in the circuit of FIG. 7.

FIG. 3 shows the waveforms at various stages in the device illustrated in FIG. 1. These waveforms correspond to the case in which a red document is read just as in the case of FIG. 8. In FIG. 3(a), only the R-component signal is generated, without generation of the G-component signal of FIG. 3(b) and B-component signal of FIG. 3(c). FIG. 3(d) is an output signal from the selection circuit 13 and the level of this signal is constant.

On the other hand, since the reference voltage H varies over the range indicated by the dotted line in FIG. 3(e), the difference in level between reference voltages H and L varies from a to b. As mentioned above, contrast is varied in accordance with the relationship between the amplitude of the analog signal and the difference between reference voltage levels H and L. Therefore, the contrast can be changed by adjusting the variable resistor 18 from the state corresponding to the difference a between the two reference voltage levels to the state corresponding to the difference b.

FIG. 4 shows the flow of signals in this embodiment. Since the reference voltage is a DC voltage, it can be freely routed and there is no limitation on the installation position of the variable resistor 8 for reference voltage control. Thus, there is no fear of degradation of performance according to installation position. Even if a noise is superimposed, it can be removed by a capacitor 19 so that the flow of signals over a long distance is made feasible. Therefore, the position of the variable resistor 18 can be determined only paying attention to convenience in use and attractiveness of design.

Furthermore, since it is not necessary to amplify the analog signal for purposes of contrast change, the economics of operation are improved, and the need for taking into consideration the blunting of waveforms due to the amplifier throughput rate is eliminated. Thus, high-fidelity characteristics are obtained.

In the above embodiment, the reference voltage level H is altered. The same result is obtained when the reference voltage level L is altered.

FIG. 5 is a waveform diagram showing waveforms at various stages in FIG. 2. FIGS. 5(a), (b) and (c) show outputs, i.e. dark voltages, of sample hold circuits 5 through 7, respectively. It is assumed that the image sensor 1 has the characteristic that the dark voltages increase in the order of R, G and B. FIGS. 5(d), (e) and (f) represent the R, G and B color signals including the dark voltages. Though the amplitudes of the color signals are uniform, the maximum amplitudes of these respective signals are dissimilar because the size of dark voltage varies according to the color signals.

FIG. 5(g) shows the pattern of output of selected color signals. The areas T1 and T3 represent the periods during which the dark voltage components are output, and the area T2 represents the period in which the color signals are output. FIG. 5(h) shows the selection and output of the dark voltages corresponding to the respective color signals at the selection circuit 11, and FIG. 5(i) shows the state after correction of color signals for dark voltages in the differential amplifier 20a. The proper color signals are thus output.

In the image reader of the invention, since the contrast is adjusted by varying the reference voltage input to the A/D converter, it is no longer necessary to amplify the analog signal, thereby improving the economics and fidelity. Moreover, as the adjustment is made in direct current, the elimination of noise is facilitated and the limitation on the installation position of the variable register is eliminated so that the convenience in use is improved and the freedom in design is also increased.

Other designs within the spirit and scope of the invention will be apparent to those skilled in the field after receiving the above teachings. The invention, therefore, is defined with reference to the following claims.

What is claimed is:

1. An image reader for reading a picture signal in analog form and outputting said picture signal in digital form, comprising:
   a first voltage generating circuit generating a first voltage for setting an upper limit of the contrast in said picture signal;
   a second voltage generating circuit generating a second voltage for setting a lower limit of the contrast in said picture signal; and
   an A/D converter receiving an input analog signal of said picture signal and outputting a digital signal in a range bounded by said first and second voltages,
   wherein at least one of said voltages respectively generated by said first and second voltage generating circuits is variable.

2. An image reader according to claim 1, further comprising:
   a dark voltage memory circuit, storing dark voltages corresponding to a plurality of color signals, and outputting dark voltage signals;
   a first selection circuit sequentially switching said output of said dark voltage memory circuit and outputting a selected dark voltage;
   a second selection circuit outputting synchronously with said first selection circuit a selected color signal corresponding to said selected dark voltage; and
   a differential amplifier subtracting said selected dark voltage from said selected color signal and outputting a corrected analog signal, wherein said corrected analog signal is said input analog signal received by said A/D converter.

3. A method of improving color contrast in a picture signal, comprising the steps of:
   generating a first voltage for setting an upper limit of contrast;
   generating a second voltage for setting a lower limit of contrast; and
   converting an analog signal to a digital signal in accordance with said first and second voltages, wherein at least one of said voltages is varied.

4. A method of improving color contrast in a picture signal according to claim 3, further comprising the steps of:
   storing dark voltages corresponding to a plurality of color signals;
   selecting one of said dark voltages;
   selecting one of said color signals; and
   subtracting said selected dark voltage from said selected color signal to obtain a corrected analog signal, wherein said corrected analog signal is used as said analog signal in said converting step.

5. A method of reading an image, the method comprising the steps of:
   a) generating an electrical signal for each of a plurality of color components read in said image;
   b) comparing the electrical signal generated for a color component to a predetermined dark voltage for the corresponding color component, thereby generating a difference signal for each color component, said difference signal representing the difference between the electrical signal for the color component read and the predetermined dark voltage;
   c) converting said difference signal to a digital signal in an analog to digital converter referenced to a high reference voltage and a low reference voltage; and
   d) adjusting contrast corresponding to said difference signal by adjusting the difference between said high and low reference voltages.

6. The method recited in claim 5 further comprising generating said electrical signals and comparing said electrical signals in a predetermined sequence of colors.

7. A method of adjusting the contrast of an image signal, the method comprising converting said image signal to a digital signal referenced to a high voltage reference and a low voltage reference and adjusting contrast by varying the differences between said high voltage reference and said low voltage reference.

8. An apparatus for adjusting the contrast of a signal read from an image, comprising:
   an analog to digital converter receiving said signal and a high voltage reference level and a low voltage reference level; and
   means for adjusting the difference between said high and low voltage reference levels to thereby adjust the contrast corresponding to said signal read from said image.

* * * * *